INVENTOR
Willem Hermes
By Fred M Vogel
Agent

Sept. 27, 1955
W. HERMES
2,719,191
CIRCUIT-ARRANGEMENT OF THE KIND COMPRISING
A PLURALITY OF AMPLIFIERS FED IN PARALLEL
Filed Sept. 12, 1951
2 Sheets-Sheet 2

INVENTOR
Willem Hermes
By Fred M Vogel
Agent 2,719,191
Patented Sept. 27, 1955

2,719,191

CIRCUIT-ARRANGEMENT OF THE KIND COMPRISING A PLURALITY OF AMPLIFIERS FED IN PARALLEL

Willem Hermes, Hilversum, Netherlands, assignor to Hartford National Bank and Trust Company, Hartford, Conn., as trustee Application September 12, 1951, Serial No. 246,252

Claims priority, application Netherlands October 17, 1950

5 Claims. (Cl. 179—171)

The invention relates to circuit-arrangement of the kind comprising a plurality of amplifiers whose input circuits are connected to the same voltage source, the output oscillations of the amplifiers being stabilized in amplitude by means of a parallel negative feedback operative across a rectifier having a threshold voltage.

With amplifiers in such a circuit-arrangement, which may, for example, be used for carrier-wave telephony, the requirements are that the output voltage should be substantially independent of variations of the input voltage, tube properties and load resistances, and that furthermore the amplifiers should not influence one another.

For stabilizing the output voltage of a carrier-wave amplifier by re-supplying to the input circuit a negative feedback voltage through a rectifier having a threshold voltage there are, in principle, two techniques: the negative feedback voltage may be supplied to the input circuit of an amplifier in series with the input voltage (negative series feedback) or in parallel herewith (negative parallel feedback). It is found, however, that in the case of negative series feedback, undesirable phase shifts are more likely to occur, which results in a poor stabilization.

If, however, use is made of negative parallel feedback, the input impedance of the amplifier is reduced, as is known, at the instant when the desired output voltage is reached and the negative feedback consequetly becomes operative. With the parallel combination of a plurality of carrier-wave amplifiers this is a drawback, since then the supply voltage is reduced, so that there is less supply energy left for the carrier-wave amplifiers which have not yet attained the desire output voltage.

According to the invention this drawback may be obviated by including an impedance inverting network in the input of the various carrier-wave amplifiers. As soon as such an input voltage is supplied to the amplifier whereby the negative feedback becomes operative, at this point an increase in input impedance of the amplifier is produced by means of an impedance inverting network, so that more energy becomes available for the other amplifiers.

In order that the invention may be more clearly understood and readily carried into effect, it will now be described more fully with reference to the accompanying drawing, in which.

Figure 1:
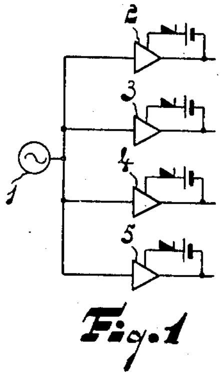
Fig. 1 shows the general circuit-diagram of a plurality of carrier-wave amplifiers fed in parallel.

Referring to Fig. 1, reference numeral 1 designates a carrier-wave voltage source, of which the output oscillation is supplied to a plurality, for example, four, parallel-connected amplifiers 2, 3, 4 and 5, the output oscillations of which are stabilized in amplitude by supplying them each through a rectifier having a threshold voltage to the input of each amplifier.

Figure 2:
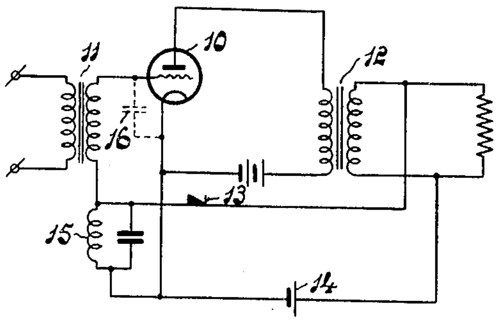
Figs. 2 and 3 show two well-known circuit-arrangements for one carrier-wave amplifier of this kind, having voltage stabilization.

Fig. 2 shows a well-known embodiment of one carrier-wave amplifier of this kind having negative feedback. The amplifier comprises an amplifying tube 10, an input transformer 11 and an output transformer 12, the output voltage being supplied through the transformer 12 and a rectifier 13 having a threshold voltage source 14, to an impedance, for example, a tuned circuit 15 included in the input circuit of the tube 10. As soon as the output voltage of the transformer 12 exceeds the threshold voltage of the source 14, the input of the amplifier has supplied to it a negative feedback voltage which prevents the output voltage from increasing further.

However, if, as is shown in Fig. 2, the negative feedback voltage is supplied through the impedance 15 in series with the input voltage of the transformer 11 to the grid of the tube 10 (negative series feedback), there is the risk that at higher frequencies such phase shifts occur, inter alia due to the parasitic tube capacity 16, that the negative feedback voltage is not in full phase opposition to the input voltage, so that the circuit-arrangement does not show satisfactory stabilization.

Figure 3:
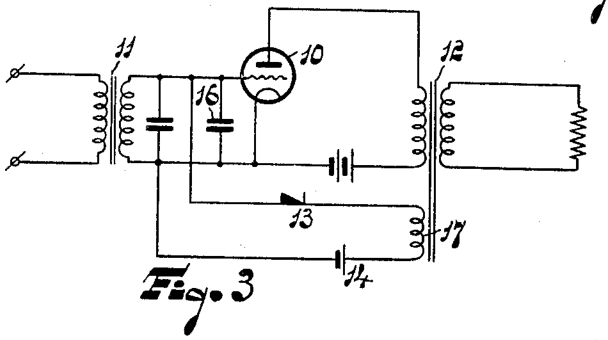

In order to avoid this, use is not made of this negative series feedback, but of a negative parallel feedback, as is shown in Fig. 3. In this case the voltage of the secondary winding 17 of the transformer 12 is supplied through the rectifier 13 and the threshold voltage source 14 to the input transformer 11 itself, in which case the parasitic capacity 16 only has a negligible effect.

However, at the instant when the negative feedback in this circuit-arrangement becomes operative, as a result of the voltage across the winding 17 exceeding the threshold voltage of the source 14, the input impedance of the amplifier is strongly reduced, so that more energy is taken from the carrier-wave voltage source 1 shown in Fig. 1. This results in that the voltage of the voltage source 1 drops, so that for the further carrier-wave amplifiers which have not yet attained the wanted output voltage at which their negative feedback becomes operative, less input energy is left. In order to avoid this, the input circuit of each amplifier includes, according to the invention, an impedance inverting network known per se.

The invention primarily seeks to provide a plural-amplifier arrangement such as is shown in Fig. 1, wherein the output voltage of each amplifier is substantially independent of variations of the input carrier wave despite the individual properties of the tubes involved in the several amplifiers as well as variations in the respective loads connected to the outputs of the amplifiers. In addition, the invention seeks to prevent interaction between amplifiers.

To effect stabilization of the respective amplifiers, each one is furnished with a parallel negative feedback, for as pointed out in connection with Fig. 3, with parallel negative feedback in contradistinction to series feedback, undesirable phase shifts are less likely to arise. As is known, with parallel feedbacks the input impedance of the amplifiers is reduced at the instant when the desired output voltage is reached, at which instant the negative feedback becomes operative to preclude any further increase in output voltage. Since in actual practice each amplifier is subject not only to different load conditions but incorporates tubes having somewhat different operating characteristics, it is found that no two amplifiers will attain the desired output level at precisely the same moment.

Hence, with a parallel combination of a plurality of carrier wave amplifiers connected to a common wave source, when any one attains its full output voltage, the resultant reduction in its input impedance at that moment reduces the supply energy left over for the other amplifiers which have not yet attained the desired output voltage. In accordance with the embodiment of the invention as illustrated in Figs. 4 to 8, this drawback is obviated by including an impedance inverting network in the input of each amplifier, whereby as soon as a particular amplifier attains its desired output and the negative feedback thereof becomes operative, at that same instant an increase in input impedance is produced so that more energy becomes available for the other amplifiers, rather than less energy.

Figure 4:
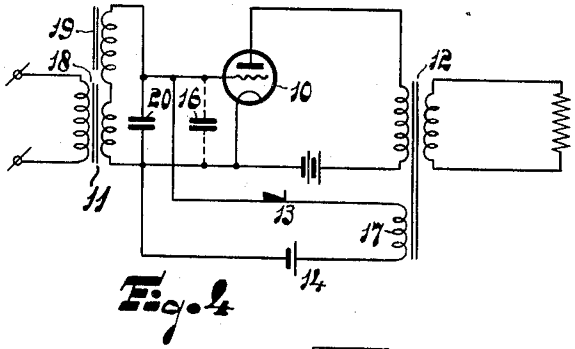
Figs. 4, 5 and 6 show improved circuit-arrangements for one amplifier of the said kind according to the invention, having various constructions of the impedance inverting network.

Fig. 4 shows a circuit-arrangement according to the invention for one of the amplifiers 2, 3, 4 or 5 shown in Fig. 1, in which in series with the input transformer 11 shown in Fig. 3 is connected an impedance inverting network comprising an inductor 19 tuned to the carrier-wave frequency and a capacitor 20, to which the negative feedback voltage is supplied. The relationship between the input impedance $r$ and the output impedance R of such a network is given by $$r=\frac{l}{R}\cdot\frac{L}{C}$$

where L designates the value of the inductor 19, C that of the capacitor 20. As soon as an amplifier takes such a high voltage that the output voltage reaches the desired level and the negative feedback becomes operative, the input impedance of the amplifier will consequently in conjunction with its impedance inverting network, increase, so that more energy of the carrier-wave voltage source 1 is left for use in the further amplifiers.

Figure 5:
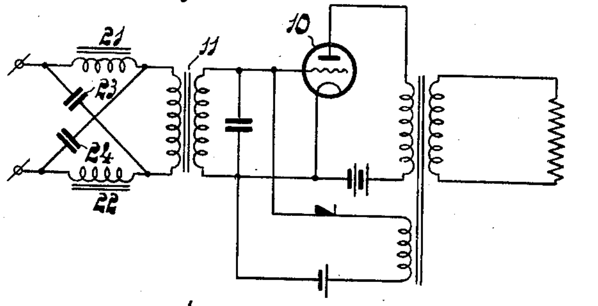

Fig. 5 shows a circuit-arrangement including a further embodiment of an impedance inverting network formed by a bridge circuit of inductors 21, 22 and capacitors 23, 24, all of which have the same impedance at the carrier-wave frequency. Otherwise the circuit-arrangement is similar to that shown in Fig. 3.

Figure 6:
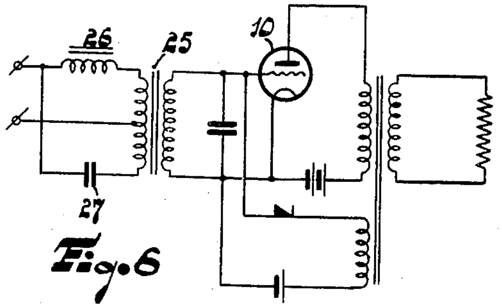

Fig. 6 shows a further embodiment of the impedance inverting network comprising, in this case, a transformer 25, of which the central tap is connected to one terminal and the two ends through an inductor 26 and a capacitor 27 respectively to the other terminal of the carrier-wave voltage source 1, the inductor 26 and the capacitor 27 again having the same impedance at the carrier-wave frequency.

Figure 7:
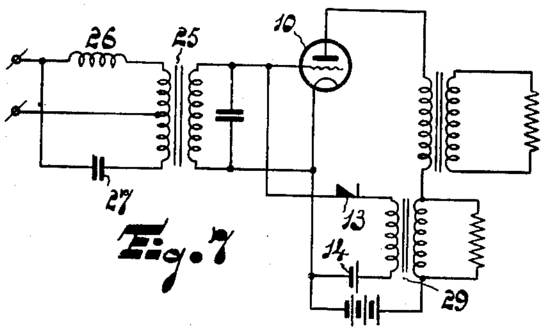
Fig. 7 shows a circuit-arrangement for one amplifier according to the invention, in which the current of the output oscillation is stabilized.

With the preceding circuit-arrangements reference has each time been made to the case in which the output voltage of the amplifying tube 10 is to be kept constant. Fig. 7, however, shows a similar circuit-arrangement in which the output current of this tube 10 is kept constant. For this purpose the negative feedback voltage is produced through a separate transformer 29 through which the anode current of the tube 10 passes and supplied through the rectifier 13 and the bias voltage source 14 parallel with the input circuit 25 to the amplifying tube. Otherwise the circuit-arrangement is similar to that shown in Fig. 6.

Figure 8:
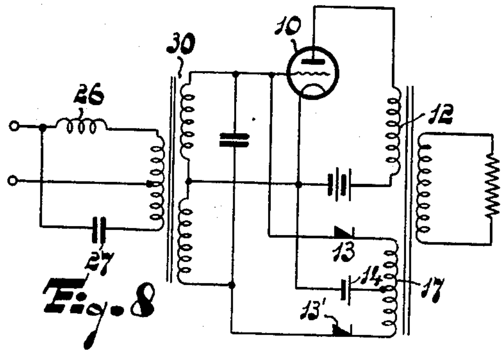
Fig. 8 shows a circuit-arrangement for one amplifier according to the invention, having push-pull stabilization of the output voltage.

Fig. 8 shows a circuit-arrangement in which the output voltage of the tube 10 is stabilized in push-pull. For this purpose the voltage produced across the secondary winding 17 of the output transformer 12 is supplied through two rectifier 13 and 13' having the said threshold voltage source 14 to the push-pull transformer 30 included in the input circuit of the amplifying tube 10, so that both in the event of the positive phase of the voltage across the winding 17 exceeding the threshold voltage of the source 14 and in the event of the negative phase of this voltage exceeding the threshold voltage, a negative feedback voltage is supplied to the input circuit of the amplifying tube 10.

What I claim is:

1. A circuit-arrangement comprising a plurality of amplifiers each having an input circuit and an output circuit, said amplifiers having similar amplification characteristics and being connected to respective loads subject to variation, means connecting the input circuits of said amplifiers to a common wave source, a parallel feedback network coupling the output circuit of each amplifier negatively to the input circuit, the network including a rectifier and a threshold voltage source whereby the negative feedback is operative only when the amplified wave produced in the output circuit exceeds a predetermined amplitude, and an impedance inverting network coupled to the input circuit of each amplifier for increasing the impedance of the input circuit as its impedance is decreased when said feedback is operative.

2. An arrangement as set forth in claim 1 wherein each input circuit includes a transformer having a primary and secondary, and wherein said inverting network is constituted by an inductance connected in series with said secondary and tuned to the carrier frequency of the input signal.

3. An arrangement as set forth in claim 1 wherein said impedance inverting network is constituted by a bridge circuit of inductors and capacitors each having an equal impedance value at the carrier frequency of the signal source.

4. An arrangement as set forth in claim 1 wherein each input circuit includes a transformer having a center-tapped primary and a secondary, an inductor, a capacitor, means connecting one end of the wave source through said inductor to one end of said primary, means connecting the other end of said wave source to the center-tap of said primary, and means connecting said capacitor between said one end of said source and the other end of said primary, said inductor and capacitor each having an equal impedance value at the carrier frequency of said source.

5. An arrangement, as set forth in claim 1, wherein said negative feedback network is constituted by a push-pull circuit including a pair of rectifiers.

References Cited in the file of this patent

UNITED STATES PATENTS

| | | |
|---|---|---|
| 1,991,195 | Darlington | Feb. 12, 1935 |
| 2,343,207 | Schrader et al. | Feb. 29, 1944 |
| 2,478,021 | Strutt et al. | Aug. 2, 1949 |
| 2,591,838 | Leroy | Apr. 8, 1952 |

FOREIGN PATENTS

| | | |
|---|---|---|
| 533,254 | Great Britain | Feb. 10, 1941 |
| 553,847 | Great Britain | June 8, 1952 |